United States Patent [19]

Lee et al.

[11] 4,322,501

[45] Mar. 30, 1982

[54] QUATERNIZATION PROCESS FOR ION EXCHANGE MEMBRANES

[75] Inventors: Cheng H. Lee, Wyckoff, N.J.; Jay M. S. Henis, Creve Coeur, Mo.

[73] Assignee: Monsanto Company, St. Louis, Mo.

[21] Appl. No.: 189,414

[22] Filed: Sep. 22, 1980

[51] Int. Cl.³ .......................... B01J 41/12; C08F 8/32
[52] U.S. Cl. ....................................... 521/32; 521/27
[58] Field of Search ........................................ 521/32

[56] References Cited

U.S. PATENT DOCUMENTS

| | | | |
|---|---|---|---|
| 3,133,889 | 5/1964 | Hazenberg et al. | 260/2.1 |
| 3,821,127 | 6/1974 | Mizutani et al. | 260/2.1 E |
| 3,847,840 | 11/1974 | Kanig | 260/2.1 E |
| 3,945,927 | 3/1976 | Imai et al. | 210/500 M |
| 3,947,351 | 3/1976 | Asawa et al. | 210/22 R |
| 4,014,798 | 3/1977 | Rembaum | 210/500 M |

FOREIGN PATENT DOCUMENTS 779178  7/1957  United Kingdom ................. 521/32

*Primary Examiner*—William F. Hamrock
*Assistant Examiner*—Peter F. Kulkosky
*Attorney, Agent, or Firm*—Lawrence L. Limpus

[57] ABSTRACT

A process is disclosed for quaternizing reactive substituent haloalkyl groups in hollow fiber polymer membranes wherein such haloalkyl groups are reacted with an amine quaternizing agent in the presence of an electrolyte compound and, preferably, in the presence of a cationic quaternary ammonium halide surfactant. In addition, there is disclosed a process of quaternizing the reactive haloalkyl groups in anisotropic hollow fiber polymer membranes by contacting and permeating a solution of an amine quaternizing agent from the surface of the membrane which is to be exposed to a dialysis feed solution.

19 Claims, No Drawings

QUATERNIZATION PROCESS FOR ION EXCHANGE MEMBRANES

BACKGROUND OF THE INVENTION

This invention relates to a process for the quaternization of membranes after formation from polymers and copolymers having active groups subject to quaternization. More particularly, it relates to a process for quaternizing hollow fiber membranes after formation from such polymers and copolymers.

Anion exchange membranes have utility in many applications involving diffusion, dialysis and electrodialysis of fluids. Among the uses for which anion exchange membranes are suitable is the separation of anions from solutions containing cations and competing anions, i.e. industrial waters and waste waters such as mine wastes, plating baths and cooling waters. Frequently such separation of anions utilizes the Donnan principle by which a solution of a multivalent ion contacting an ion exchange membrane will transfer the multivalent ion to a more concentrated solution of ions of a lower valency. Anion exchange membranes contain anion exchange groups either introduced into the membrane or developed therein by suitable treatment. In order to provide for exchange of anions, such membranes require the presence of cationic groups such as quaternary ammonium groups. Development of quaternary ammonium groups will depend on the nature of the active groups in the polymers comprising the membrane. If the polymer contains tertiary amino groups these can be reacted with alkyl halides to produce the desired quaternary ammonium groups; whereas if the polymer contains active haloalkyl groups they can be treated with tertiary amines to produce quaternary ammonium groups.

In the prior practice it has been known to prepare polymers and copolymers in resin form containing potentially active anion exchange sites and to react the polymers in such form to produce the anion exchange groups. It has been taught that such quaternization reactions as those with alkyl halides and tertiary amines can also be carried out after the formation of membranes from the potentially ionically active polymers. When such reactions have been conducted for sufficient periods to substantially quaternize the available reactive groups, the permeability and separation properties as well as the homogeniety of the membrane quaternized after formation are frequently improved over those properties of membranes formed from previously quaternized polymers. Consequently, quaternization after membrane formation is preferred.

In the instance of membranes produced in the form of hollow fibers, it has been found to be most desirable to convert the potentially ionically active sites to ionic form after formation of the hollow fiber membranes. Attempts to closely control the morphology and porosity of hollow fiber membranes if spun from solutions of ionically active polymers have not been notably successful. It has been proposed in U.S. Pat. No. 3,945,927 of Imai et al. to coat a porous substrate with a thin film of a potentially ionically active polymer and thereafter introduce ion-exchange groups to only the thin coating film to produce ion exchange composite membranes. Such a composite membrane utilizes only the thin coating film for anion exchange dialysis.

It has also been proposed in U.S. Pat. No. 3,944,485 of Rembaum et al. to impregnate a pre-formed hollow fiber with mixtures of polymerizable monomers and to polymerize such monomers to form cross-linked, insoluble ion-exchange resin particles embedded within the pores of the fiber. It has been further proposed to additionally aminate and quaternize such embedded, insoluble ion-exchange resin particles by Rembaum in U.S. Pat. No. 4,014,798. Previously known methods of amination and quaternization are suggested therein.

Various methods have been proposed in the past for carrying out such quaternization reactions. These include exposure to vaporized low molecular weight quaternizing agents as well as soaking in solutions of various concentrations of the quaternizing agents. The solutions have generally utilized solvents which do not take part or interfere with the quaternization such as water, alkanols, and hydrocarbons such as hexane, hexene, cyclohexane, benzene and the like. However, the more dense and compact the structure of the membranes cast or extruded the slower the quaternization reaction proceeds and the longer the time required to obtain substantial reaction of the active groups present in the polymer membranes. A convenient method of carrying out quaternization reactions on such previously formed hollow fiber membranes whereby substantial degrees of quaternization are readily obtained and the hollow fiber membranes display high ion exchange capacity is desired.

SUMMARY OF THE INVENTION

The invention is directed to an improved process for quaternization of hollow fiber polymer membranes having active substituent haloalkyl groups subject to quaternization utilizing solutions of quaternizing agents. It has been found that hollow fiber membranes demonstrating improved ion-exchange permeation and selectivity, or separation factor, for chromate anions with respect to sulfate anions are realized by carrying out the quaternization reaction with solutions of the quaternizing agents in the presence of an electrolyte compound. Preferably, the reaction also is carried out in the presence of a cationic surfactant. It has also been found that, in hollow fiber membranes, the quaternization reaction produces the most improved permeation and selectivity properties when carried out by contacting and permeating the solution of quaternizing agent from the surface of the membrane which is to be exposed to the solution containing the multivalent anion or anions to be separated, i.e., the dialysis feed solution. Generally, this surface is the outer surface of the hollow fiber membrane since that surface affords the greater area for contact.

DESCRIPTION OF PREFERRED EMBODIMENTS

Quaternization reactions of active radicals in compounds have long been practiced. When carried out on polymers carrying the active radicals, the accessibility of the active radicals to the quaternizing agent controls the rate and degree of the quaternization reaction. If the polymer is in solution when reacted the accessibility of the radicals is high. But when such reactions are conducted on polymers in solid form the reaction proceeds at varying rates since the quaternizing agent must be able to reach and contact the active radical to react with it. Many variables affect the rate of reaction including the form, density, porosity and concentration of active radicals of the polymers and the state, concentration, molecular size and like conditions of the quaternizing agent. Processes employing solutions of quaternizing agents for reaction with active radicals present in polymers in the form of hollow fiber membranes are subject to these and to other variables.

Quaternized anion exchange hollow fiber polymer membranes also vary in the accessibility of the active quaternary groups to ions in solution. In desirable anion exchange hollow fiber membranes the quaternary groups display a high accessibility to the anions subject to exchange as well as the ability to selectively adsorb and permeate certain anions in respect to others. These properties are reflected in the measurements of permeability of an anion exchange membrane to one or more specific anions and the separation factor of the membrane for a specific anion in respect to another specific anion. The conduct of the quaternization reaction influences these properties of the quaternized membrane.

We have found that the presence of an electrolyte compound soluble in the quaternizing solutions when reacted with active haloalkyl sites in hollow fiber polymer membranes can improve the permeability to chromate anions and the separation factor for chromate anions with respect to sulfate anions of such membranes. Any hollow fiber polymer membrane having available reactive haloalkyl sites within its structure can be converted by quaternization to an anion exchange membrane. Such hollow fiber polymer membranes can be prepared from a wide range of polymers, copolymers and blends of polymers. In general, homopolymers with a high concentration of quaternary ammonium groups swell excessively in water and tend to be extremely weak. Consequently, the preferred polymers for forming membranes for conversion to anion exchange membranes by quaternization are copolymers and blends of polymers. In these preferred copolymers and blends a minor proportion of the total polymeric content has active haloalkyl groups subject to quaternization, while the remaining polymeric constituents afford strength and integrity to the hollow fiber membranes produced. The most preferred polymeric materials are copolymers of two or more monomeric constituents since such materials will afford a high degree of chemical homogeneity in the fiber membrane product.

For the production of hollow fiber anion exchange membranes by the quaternization reaction, copolymers and blends produced from monomers having the most available and readily reacted haloalkyl substituents are preferred. The most preferred monomers for these reasons as well as ready availability are the vinyl benzyl halides such as vinyl benzyl chloride, and vinyl benzyl bromide. Other polymerizable monomers possessing haloalkyl substituents can be used including haloalkylated unsaturated acids, such as vinylbromo acetic acid, allylchloro acetic acid, vinylchloro propionic acid and the like, haloalkylated unsaturated esters such as vinylchloro acetate, allylbromo propionate and the like, and haloalkylated unsaturated ethers, such as brominated vinyl ether, chlorinated allyl ether and the like. However, in most cases, haloalkylated monomers are not so readily available as the vinyl benzyl halides and their copolymers often reflect a limited accessibility of the haloalkyl substituents to the quaternization reaction. Most often the copolymers or blends are the result of the copolymerization of the vinyl benzyl halide with copolymerizable monomers which have no active haloalkyl groups, such as acrylonitrile, methacrylonitrile, styrene, methyl styrene, acrylic and methacrylic acids, alkyl acrylates, alkyl methacrylates and the like. The blended polymers can be produced by blending polymers or copolymers of the vinyl benzyl halide with polymers of one or more of the other monomers having no active haloalkyl groups.

The copolymers or blends of polymers used for the formation of the hollow fiber polymer membranes subjected to the process of this invention include those of fiber-forming molecular weight, i.e. generally in excess of about 25,000 weight average molecular weight. Frequently, such polymers and copolymers will range from about 40,000 to about 3,000,000 or more weight average molecular weight, and most preferably from about 50,000 to about 2,500,000 weight average molecular weight.

Methods of producing membranes in hollow fiber form by means of spinning fiber-forming polymer solutions from hollow fiber spinnerettes into coagulants therefor have long been known. Methods of producing anisotropic hollow fiber membranes by means of solution spinning have recently been developed. Hollow fiber membranes produced by any of these known solution spinning processes can be quaternized by the process of this invention. The most effective solution spinning processes for the production of anisotropic hollow fiber membranes are those processes employing, in the fiber-forming spinning solution, a liquid carrier comprising a solvent for the polymer and a liquid diluent. Such solution spinning processes, particularly as applied to the spinning of copolymers of vinyl benzyl halide, have been described in detail in the copending patent application of Lee, Henis and Perry, filed of even date herewith, and directed to Anion Exchange Membranes and Selective Recovery of Chromate Thereby, U.S. Ser. No. 189,272 filed Sept. 22, 1980, which copending application is incorporated herein by reference. Anisotropic hollow fiber membranes produced by the solution spinning processes described in the above referenced application have desirable physical properties and are most preferred for quaternization by the process of this invention.

The preformed hollow fiber polymer membranes are converted from inactive form to the anion exchange hollow fiber membranes by subjecting the membranes to a quaternization reaction with amine quaternization agents. Such amine quaternizing agents comprise the tertiary amines themselves, or tertiary amino substituted compounds. The amine quaternizing agents usually employed include lower trialkylamines such as trimethylamine, triethylamine, tripropylamine and the like, triarylamines such as triphenylamine and tertiary amino substituted compounds such as dimethylamino ethanol, diethylamino ethanol, 1-methylimidazole and the like. Diamines such as ethylene diamine, propylene diamine, and triethyl diamine are useful for quaternization reactions but can sometimes result in a degree of crosslinking of the polymers. The most preferred quaternizing agents because of their small molecular size and consequent more rapid diffusion into solid polymers and reaction with the available reactive haloalkyl sites are the lowest trialkyl monoamines, trimethylamine and triethylamine.

The solvents suitable for dissolving the amine quaternizing agents to form the quaternizing solutions include those good solvents therefor which do not interfere with the quaternizing reactions such as water, alkanols, petroleum ether, hexane, cyclohexane, and the like. Of the above solvents the most preferred are water and the alkanols such as methanol and ethanol. The concentrations of the amine quaternizing agents in the quaternizing solutions can generally range from about 3 to about 50 weight percent, preferably from about 5 to about 25 weight percent and most preferably from about 5 to about 15 weight percent. The quaternizing solutions can be contacted with the hollow fiber polymer membranes at temperatures which do not deleteriously affect the strength of the resulting quaternized membrane. Temperatures of from about 0° to about 50° C. are entirely suitable. Temperatures above about 75° C. are generally to be avoided because of the potential for weakening the hollow fiber membranes.

The electrolyte compounds suitable for use in the quaternizing solutions useful in this invention are any electrolytes soluble in the quaternizing solutions and inert with respect to the amine quaternizing agents. Generally such electrolyte compounds include such compounds as alkali metal, alkaline earth metal, ammonium and quaternary ammonium hydroxides and mineral acid salts. Salts are generally the most preferred electrolyte compound additives. Thus the electrolyte compounds suitable for addition include such salts as sodium chloride, calcium chloride, ammonium chloride, lithium chloride, potassium chloride, magnesium chloride, the corresponding bromides, potassium nitrate, sodium nitrate, tetraalkyl-ammonium halides such as tetramethyl ammonium chloride, tetramethyl ammonium bromide, tetraethyl ammonium bromide and tetraamyl ammonium chloride as well as such hydroxides as sodium hydroxide, potassium hydroxide, magnesium hydroxide, ammonium hydroxide and tetramethyl ammonium hydroxide. Also useful as electrolytes are the long chain alkyl quaternary ammonium compounds described hereinafter as useful as surfactants, such as hexadecyl trimethyl ammonium chloride or bromide and similar ionizable quaternary ammonium halides. The electrolyte compound must be soluble in the quaternizing solution. However, it is not essential that the electrolyte be ionized in that solution, but only that it be ionized in water solution. The most convenient and economical of the electrolytes is frequently sodium chloride and consequently that electrolyte compound is most often used. Concentrations of the electrolyte compound in the quaternizing solutions are limited only by the amounts of such electrolytes which might diminish the solubility of the quaternizing agents in the solutions or interfere with the quaternization reaction. Generally the concentrations found useful range from about 0.05 to about 10 weight percent, frequently the preferred concentration of electrolyte compounds is from 0.1 to about 5 weight percent and the most preferred concentrations range from about 0.2 to about 4 weight percent.

Though the function of the electrolyte compound present in the quaternizing reaction is not fully understood, it is believed that such compounds may function in at least two ways to improve the permeation properties of the resulting quaternized hollow fiber polymer membranes. In the first instance it is believed that the electrolyte compounds present in the pores of the hollow fiber membrane, and particularly in those pores in the dense barrier layers of anisotropic hollow fibers, serve to diminish the densification of the polymers during quaternization and subsequent drying of the hollow fiber membranes. The action of the quaternizing agents during the quaternization reaction upon the polymers is initially to swell those polymers. Then the agents react with the active haloalkyl groups present. Finally they act to densify the structure of the polymer due to the combination of the relaxed polymer morphology as a result of the swelling and the ionic groups produced. The densification is due to the strong electrostatic interactions between the ionic groups present in the quaternized fiber membrane. This latter effect has been observed through the use of electron microscopy and is reflected in the higher glass transition temperatures found in the quaternized polymer fibers after the quaternization reaction. If an electrolyte compound is present in the pores of the hollow fiber membranes then the densification of the polymer, particularly in the dense layers, will be more limited than would otherwise occur. Limiting this densification aids in preserving the desirable permeability of the hollow fiber membrane. However, in the absence of electrolyte compounds present in the pores of the hollow fiber membranes during quaternization thereof, densification of the polymer during the quaternizing reaction and subsequent drying can result in impaired permeability and consequent lower ion exchange capacity of the quaternized hollow fiber membranes.

It is also postulated that electrolyte compounds trapped and remaining within the pores of the quaternized hollow fiber membranes can also act as "ion-exchange carriers," or in the nature of ion-exchange sites. Such trapped electrolyte compounds may serve to exchange with the counter-ions and serve as "bridges" across the pores of quaternized hollow fiber membrane. In the absence of electrolyte compounds therein, such pores would serve as barriers to the exchange of ions across these spaces.

It is possible that the presence of the electrolyte compounds during the quaternization reaction may be serving other functions than those postulated above. In any event, it has been found that the permeabilities to chromate anions and the separation factor for chromate anions with respect to sulfate anions in anionic hollow fiber polymer membranes is enhanced through their presence during the quaternization reaction.

The presence of the electrolyte compound during the quaternization reaction can be assured in a number of ways. Thus, the hollow fiber polymer membranes to be quaternized can be immersed in a pre-treatment solution comprising the electrolyte compound in a similar concentration range to permeate or diffuse such electrolyte compound into the pores of the membrane prior to subjecting the membranes to quaternization. Alternatively, the electrolyte compounds can be dissolved in the quaternizing solution itself. When such a pre-treatment step is utilized it is generally carried out for periods of from about 1 to 50 hours, preferably from about 3 to 24 hours, prior to quaternization of the fibers. When a two-step quaternization procedure is utilized, which includes a pre-treatment solution, it is preferred that the electrolyte compound be present both in the pre-treatment solution and in the quaternizing solution for best results.

We have also found that the permeation properties of anion exchange hollow fiber polymer membranes produced by quaternization reaction are improved when such reaction is carried out in the presence of a cationic quaternary ammonium halide surfactant. There are many cationic quaternary ammonium halide surfactants known and commercially available and any of the materials of this class are suitable. Typical of such long chain alkyl substituted quaternary ammonium surfactants are the hexadecyl trimethyl ammonium chloride and hexadecyl trimethyl ammonium bromide. When used in relatively small concentrations typical of wetting agents generally, such as from 0.001 to 0.05 weight percent, these cationic quaternary ammonium halide surfactants aid in the penetration and permeation of the pre-treatment and quaternizing solutions into the pores of a hollow fiber polymer membrane. Thereby they serve to increase the rate and completeness of the quaternization reaction by insuring that the quaternizing agents are accessible to the reactive haloalkyl sites. The best results are obtained when the cationic surfactant is added to both the pre-treatment solutions and the quaternizing solutions. As previously noted, when present in amounts somewhat greater than typical for that class of cationic surfactants, quaternary ammonium halide surfactants can also serve as electrolyte compounds. Thus, when present in amounts from about 0.1 to 1 weight percent or more, the quaternary ammonium halide surfactants can replace a portion or all of another electrolyte compound and the same advantageous permeation properties can be realized.

It has been found that staging of the quaternization reaction can improve the permeabilities to chromate anions of hollow fiber membranes. One method of staging the quaternization reaction is to subject the hollow fiber membrane to a relatively short pre-reaction treatment with a solution of a quaternizing agent prior to a full quaternization reaction. This short pre-reaction treatment, which may range from 10 minutes to 3 hours or more, results in initially swelling the hollow fiber membranes. It is followed by reacting the haloalkyl groups in the membrane for a longer period with a solution of a quaternizing agent containing an electrolyte compound in an effective concentration as previously described. The pre-reaction treatment, coupled with the presence of the electrolyte compound in the solution of quaternizing agent contacted for the period effective to quaternize at least a portion of the haloalkyl groups present, has been found to result in improved permeabilities of the hollow fiber membranes for chromate anions as well as good separation factors for chromate anions with respect to sulfate anions.

We have found that the same level of improvement in the permeabilities for chromate anions induced by pre-reaction treatment with a quaternizing agent can also be realized by pretreatment with a solution of an electrolyte compound, preferably also containing a cationic surfactant. The pretreatment step is carried out, as described above, for periods of from about 1 to 50 hours, preferably from about 3 to 24 hours. The pretreatment solution preferably contains both the electrolyte compound and the preferred cationic surfactant in approximately the same range of amounts as found useful in the quaternizing solution of a quaternizing agent. Lower or higher amounts of the electrolyte compound and cationic surfactant can be used and are effective as pretreatment solutions.

Hollow fiber membranes can be produced which are isotropic, i.e. having the same density throughout the fiber wall from the exterior to the interior surface, or anisotropic, i.e. having varying density across the fiber wall. The varying density characteristic of anisotropic hollow fibers can be of several types. One type of anisotropic hollow fiber has a density gradient or density change across the fiber wall with no definite dense layer or layers. Another type has a dense layer in the interior of the wall thickness with less dense thicknesses toward each hollow fiber surface. Still other types possess a relatively thin, dense layer or skin at either the interior surface or the exterior surface of the hollow fiber membranes. A desirable type of anisotropic hollow fiber membrane possesses a thin, dense layer or skin at both the interior and exterior surfaces of the hollow fiber membrane. This latter type of anisotropic hollow fiber membrane is produced by the preferred solution spinning processes described in the copending application referenced above when a liquid coagulant for the preferred fiber-forming spinning solution is contacted on both the interior and exterior surfaces of the hollow fiber during its formation. The anisotropic hollow fiber membranes discussed below and described in the examples were of this latter type having a thin, dense layer at both the interior and exterior fiber surfaces.

We have found that the method of contacting the quaternizing solutions for carrying out the quaternization reaction on anisotropic hollow fiber membranes having thin, dense layers at both surfaces strongly affects the permeability and separation properties of the resulting anion exchange membranes. Surprisingly, the quaternization reaction will produce the best permeation properties when it is conducted by contacting and permeating the quaternizing solutions from the surface of the anisotropic hollow fiber membrane which is to be exposed to the dialysis feed solution containing the multivalent anion or anions to be separated. Such a method of contacting quaternizing solutions with only one surface of a hollow fiber membrane is termed asymmetric quaternization. If the intended dialysis reaction is to be carried out with the anions to be permeated from a dialysis feed solution contacting the exterior of the anisotropic hollow fiber membranes, then the quaternizing solution employed to produce the ion exchange hollow fiber membranes should likewise be contacted with the exterior surface thereof. This method of contacting is more frequently used since the exterior surface affords the greater surface area for contact with the dialysis feed solution from which the anions are to be permeated. When conducted in this manner upon anisotropic hollow fiber polymer membranes having thin, dense layers or regions at each of the exterior and interior surfaces thereof the asymmetric quaternization procedure has been found to result in substantially greater permeability for chromate anions than when that procedure is carried out in the reverse direction of the intended dialysis, i.e. quaternization from the interior or intended dialysate surface of the hollow fiber membrane, or in both directions. The differences in permeability for chromate anion from a dialysis feed solution have ranged from about 15 to 35 percent lower when the quaternizing solutions have been contacted with both the interior and exterior surfaces of the membrane for penetration from both directions than when the quaternizing solutions are contacted with the exterior surface only, and in both cases the dialysis feed solution is contacted with the exterior surface of the membranes. These differences have been as great as two orders of magnitude when the quaternizing solutions were contacted against only the exterior and against only the interior surface during quaternization of the hollow fiber membranes and the dialysis feed solution is thereafter contacted with the exterior surface for permeation of chromate anion. When it is desired to contact the dialysis feed solution from which anions are to be permeated with the hollow fiber bores in order to permeate anions from the interior surface of the anisotropic hollow fiber membranes having thin, dense layers at both surfaces, then the quaternizing solutions should be contacted with the interior surfaces thereof for the best permeation properties.

The reasons are not fully understood for the surprising and substantially lower permeabilities found with the anisotropic hollow fiber anion exchange membranes when quaternized from both surfaces or the opposite surface to that to be contacted with the dialysis feed solution. In both procedures the quaternizing solutions are allowed to permeate totally throughout the membrane and the degree of completeness of the quaternization reaction in both instances is believed to be comparable. It may be postulated that the higher concentrations of quaternizing agents in the fresh quaternizing solutions contacting the dense layers at each of the interior and exterior surfaces might result in relatively greater swelling of the polymer and consequently a greater morphological rearrangement and densification of both layers after the quaternization reaction is completed than in the instance when only one of such dense layers is directly contacted with the fresh quaternizing solution. If such were the case, then both the dense layers at the exterior and the interior of the hollow fiber membrane would have been densified to a greater extent. This might result in lowered accessibility of the quaternized ion exchange sites for exchange of anions and consequent lower overall permeability of the anisotropic hollow fiber membrane.

When anisotropic hollow fiber membranes of the other types described above having only one or no thin, dense layer are quaternized for use in anion exchange dialysis, it is expected that desirable permeabion properties will result if the quaternization reaction is conducted asymmetrically, that is by contacting the quaternization solutions with the surface of the anisotropic hollow fiber membrane which is to be contacted by a dialysis feed solution. In any event we have realized the most desirable permeation properties when carrying out the quaternization reaction by contacting the quaternizing solutions with that surface to be exposed to the dialysis feed solution of an anisotropic hollow fiber membrane having two dense surface layers and permeation through the membrane of the quaternizing solution from that surface. Consequently, conducting the quaternization reaction for those anisotropic hollow fiber membranes in such asymmetric manner is a preferred and advantageous feature of the present invention. Such a result from the asymmetric quaternization of anisotropic hollow fiber membranes has not been previously reported.

The manner of conducting the improved quaternization reaction described utilizes apparatus conventional in the art of quaternization. The hollow fiber polymer membranes may be subjected to any of the solutions described, i.e. the prereaction treatment solutions, the pretreatment solutions and quaternizing solution, by submerging in baths of the solutions, or by circulating the solutions about bundles of the hollow fiber membranes. Likewise, if the interior bores of such hollow fiber membranes are to be treated, then the respective solutions can be circulated by pump through the fibers when assembled in bundles and manifolded such that the bores are accessible to the solutions. No unconventional apparatus or devices are required.

In the examples hereinafter the permeabilities of the membranes are reported, unless otherwise indicated, in terms of permeability, P/l, in cm/sec for a given anion. The permeability, P/l, of a membrane of thickness "l" for ion "a" may be defined as:

$$(P/l)_a = J/C_a \quad (1)$$

where J is the permeation flux for ion "a" and C is the concentration of ion "a" in the dialysis feed solution. In the case of countercurrent dialysis when a counterion is present in the dialysis sump solution or dialysate in much higher concentration than the concentration of ion "a" in the dialysis feed solution the permeability of the membrane of thickness "l" for ion "a" is:

$$(P/l)_a = (F/A) \log_n (C_o/C_f)_a \quad (2)$$

where F is the flow rate of the feed solution (cm$^3$/sec.), A is the surface area of the membrane (cm$^2$), Co is the concentration of ion "a" in the dialysis feed solution before dialysis and $C_f$ is the concentration of ion "a" in the depleted dialysis feed solution after dialysis.

The separation factor (SF) for the chromate anion with respect to the sulfate anion may be defined as:

$$SF^{CrO4-2}_{SO4-2} = \frac{(P/l)_{CRO4-2}}{(P/l)_{SO4-2}} \quad (3)$$

The following examples are provided to illustrate the invention and not in limitation thereof. All parts and percentages of liquids are by weight, unless otherwise indicated. The composition of copolymers are generally stated in terms of mol percent unless otherwise indicated.

EXAMPLE 1

A comparison is made between the rates of the quaternization reaction when carried out on a dense flat film membrane and an anisotropic hollow fiber membrane of essentially the same copolymer composition. The dense film membrane, 25.4 microns (1 mil) thick, of a copolymer of 16 mol percent vinyl benzyl chloride and 84 mol percent styrene was immersed in a quaternizaing aqueous solution of 25 weight percent trimethylamine. The anisotropic hollow fiber membrane was wet spun from a 25 weight percent solution in dimethylformamide of a copolymer of 14.1 mol percent vinyl benzyl chloride and 85.9 mol percent styrene having an intrinsic viscosity of 0.20. The hollow fiber membrane of 775 microns outside diameter, 475 microns inside diameter and 150 microns wall thickness and having an approximately 2 micron thick dense layer on each of the exterior and interior surfaces, was also quaternized by immersing in an aqueous solution of 25 weight percent trimethylamine. The progress of the quaternization reaction was followed by taking samples of the membranes at frequent intervals and determining the percent of nitrogen present in the copolymer composition as compared to that expected from reaction of all the benzyl chloride groups present as an indication of the completeness of the quaternization reaction. It was found that the first order rate constant of the quaternization reaction in the hollow fiber membrane was about 4 times that in the dense film membrane, i.e., quaternization of the hollow fiber membrane was about four times as fast as that of the dense film membrane. The rate constant in the hollow fiber membrane determined as above was about $3.7 \times 10^{-4}$ while that for the dense film membrane was about $9.7 \times 10^{-5}$.

EXAMPLE 2

Anisotropic hollow fiber membranes comprising copolymers of 14.1 mol percent vinyl benzyl chloride, 71.4 mol percent styrene and 14.5 mol percent butyl methacrylate of approximately 400,000 weight average molecular weight were formed by solution spinning the copolymers from liquid carriers comprising mixtures of dimethyl formamide with methanol and isopropanol, respectively. The fiber membrane shown in Table 1, spun from a 2/1 by weight mixture of dimethyl formamide and methanol, had dimensions of 850 microns outside diameter, 300 microns inside diameter and a wall thickness of about 275 microns. The fiber membrane shown in Table 2 spun from a 2/1 by weight mixture of dimethyl formamide and isopropanol, had dimensions of 786 microns outside diameter, 458 microns inside diameter and a wall thickness of 164 microns. Both hollow fiber membranes had a thin, dense layer at each of the exterior and interior surfaces. Both hollow fiber membranes were dried after formation and had been stored in the dry state for a period of at least 14 days before undergoing quaternization. The hollow fiber membranes were quaternized by immersing in aqueous solutions of 10 weight percent trimethylamine overnight (20–24 hours). The solutions contained the weight percent of various electrolyte salts indicated in Tables 1 and 2. The hollow fiber membranes of the above composition, solution spun under different conditions and quaternized in the presence of various electrolyte compounds, were tested in continuous flow dialysis employing an aqueous dialysis feed solution comprising chromate and sulfate anions and calcium and sodium cations and an aqueous sump solution comprising 3% sodium chloride.

From the results shown in Tables 1 and 2 it can be seen that improvements in the permeation properties of the hollow fiber membranes are obtained by use of quaternizing solutions containing electrolyte salts. In the case of the hollow fiber reported in Table 1 the separation factors for chromate anions with respect to sulfate anions were generally improved. For the fiber reported in Table 2 the permeabilities were generally improved while the separation factors were maintained at a desirable level or increased.

TABLE 1

| Quaternizing Soln. 10 wt. % TMA plus: | $(P/l)_{CrO_4-2}$** (cm/sec) | $SF_{SO_4-2}^{CrO_4-2}$ |
|---|---|---|
| 1. —$^a$ | $2.4 \times 10^{-4}$ | 2.0 |
| 2. —$^b$ | $2 \times 10^{-4}$ | 2.2 |
| 3. 0.2% CaCl$_2$ | $1.6 \times 10^{-4}$ | 3.5 |
| 4. 0.2% NH$_4$Cl | $1.7 \times 10^{-4}$ | 4.0 |
| 5. 1% (C$_5$H$_{11}$)$_4$NCl* | $1.85 \times 10^{-4}$ | ≧4.0 |

$^a$fiber vacuum dried after quaternization
$^b$water washed and fiber wet after quaternization
*1 wt. % tetraamyl ammonium chloride
**Dialysis feed solution - 25 ppm CrO$_4^{-2}$, 1500 ppm SO$_4^{-2}$, 200 ppm Ca$^{+2}$

TABLE 2

| Quaternizing Sol'n. 10 wt. % TMA plus | $(P/l)_{CrO_4-2}$** (cm/sec) | $SF_{SO_4-2}^{CrO_4-2}$ |
|---|---|---|
| 6. — | $2.1 \times 10^{-4}$ | 4 |
| 7. 1% NaCl | $4.4 \times 10^{-4}$ | 3.5 |
| 8. 3% NaCl | $5.7 \times 10^{-4}$ | 3 |
| 9. 6% LiCl | $5 \times 10^{-4}$ | 3 |
| 10. 13% (CH$_3$)$_4$NBr* | $2.3 \times 10^{-4}$ | ≧4 |
| 11. 5% NH$_4$Cl | $1.7 \times 10^{-4}$ | 5 |
| 12. 7% KCl | $4.6 \times 10^{-4}$ | 4.5 |

*13 wt. % tetramethyl ammonium bromide
**Dialysis feed solution - 50 ppm CrO$_4^{-2}$, 1500 ppm SO$_4^{-2}$, 200 ppm Ca$^{+2}$

EXAMPLE 3

Quaternization reactions of anisotropic hollow fiber membranes with aqueous quaternizing solutions of 10 weight percent trimethylamine and 3 weight percent sodium chloride were conducted wherein prior to the full quaternization reaction for 20–24 hours the fiber membranes were first pre-reacted for 90 minutes in an aqueous solution of 5 weight percent trimethylamine. Several different hollow fiber membranes of copolymers of the indicated mol percent compositions of vinyl benzyl chloride (VBC), styrene (St) and butyl methacrylate (BMA) were carried out with the above pre-reaction step. The addition of the pre-reaction step together with the presence of the sodium chloride electrolyte in the quaternizing solution increased the permeabilities for chromate anions of the quaternized and dried hollow fibers as shown in Table 3. All the fiber membranes demonstrated separation factors for chromate anions with respect to sulfate anions of 3 to 4.

TABLE 3

| Fiber Membrane$^a$ | Pre-Reaction Step | $(P/l)_{CrO_4-2}$ |
|---|---|---|
| A | No | $3.2 \times 10^{-4}$ |
| A | Yes | $5 \times 10^{-4}$ |
| B | No | $2.4 \times 10^{-4}$ |
| B | Yes | $6.7 \times 10^{-4}$ |
| C | No | $1 \times 10^{-4}$ |
| C | Yes | $4.2 \times 10^{-4}$ |

$^a$A = 14.1VBC/71.4 St/14.5 BMA, 43,600 wt. avg. mol. wt., spun from 25% solution in a 2/1 by wt. mixture of dimethyl formamide/isopropanol, dimensions 715 μ O.D. and 385 μ I.D.
B = Same copolymer as A spun from 25% solution in a 1/1 by wt. mixture of N-Methylpyrrolidone/1,4-dioxane; dimensions 930 μ O.D. and 400 μ I.D.
C = 15 VBC/65 St/20 BMA, 72,500 wt. avg. mol. wt., spun from 25% solution in a 1/1 by wt. mixture of N-Methylpyrrolidone/1,4-dioxane, dimensions 1058 μ O.D. and 600 μ I.D.

EXAMPLE 4

The quaternization procedure using the pre-reaction step as in Example 3 was carried out in two ways on an anisotropic hollow fiber membrane similar to that used in Table 2 of Example 2 above with dimensions of 786 microns outside diameter and 458 microns inside diameter and having a thin, dense layer at both the exterior and interior surfaces. Membrane D in Table 4A was quaternized symmetrically by contacting both the pre-reaction solution of 5 weight percent trimethylamine and the quaternizing solution of 10 weight percent trimethylamine and 3 weight percent sodium chloride against both the exterior and inferior surfaces of the hollow fiber membranes. Membrane E was contacted with the pre-reaction and quaternizing solutions asymmetrically on the exterior surface only, the fiber bores being sealed. The progress of quaternization is recorded in terms of the time in minutes of the pre-reaction step. In every case the pre-reaction step was followed by reaction overnight with the sodium chloride and trimethylamine quaternizing solution. The permeability for chromate was determined upon dialysis of dialysis feed solution containing chromate anions contacting the exterior surface of the membrane. It is apparent that carrying out the quaternization reaction asymmetrically resulted in improved permeabilities of the membrane to chromate anions. In all cases the separation factors for chromate anions with respect to sulfate anions were from 3 to 4.

TABLE 4A

| Time of Pre-reaction Step (min) | $(P/l)_{CrO_4-2}$ (cm/sec) | |
|---|---|---|
| | Membrane D | Membrane E |
| 10 | $4.1 \times 10^{-4}$ | $5.0 \times 10^{-4}$ |
| 20 | $4.5 \times 10^{-4}$ | $5.7 \times 10^{-4}$ |
| 40 | $5.0 \times 10^{-4}$ | $7.1 \times 10^{-4}$ |
| 90 | $6.4 \times 10^{-4}$ | $1 \times 10^{-3}$ |

The method of carrying out the quaternization reaction of anisotropic hollow fiber membranes from the surface of the membrane which is to be exposed to the dialysis feed solution containing the multivalent anions to be separated is further shown to produce the desired permeation properties in the following test. The hollow fiber membranes comprised a copolymer of 15 mol percent vinyl benzene chloride, 70 mol percent styrene and 15 mol percent butyl methacrylate of about 62,500 weight average molecular weight and were solution spun from a 33% solution in a 2/1 by weight mixture of dimethylformamide and isopropanol. Single hollow fiber membranes with the bores sealed at the ends with silicone and rubber and test bundles of hollow fibers with end seals formed of epoxy resin were subjected to a two step quaternization procedure. The active areas of the hollow fiber membranes were immersed for three hours in an aqueous solution of 3 weight percent sodium chloride and 0.02 weight percent of a cationic surfactant and then reacted overnight in an aqueous quaternizing solution comprising 10 weight percent trimethylamine, 3 weight percent sodium chloride and 0.02 weight percent cationic surfactant. In runs A and B only the exterior surfaces of the fiber membranes were contacted by the pretreatment and the quaternizing solutions. In run C the same pretreatment and quaternizing solutions were pumped through the bores of the fiber test bundle for the same times and only the interior surfaces of the fibers were contacted. Permeabilities and separation factors for chromate anion are shown in Table 4B for dialysis feed stream of the same composition contacted for dialysis against the exterior surfaces of the membranes.

TABLE 4B

| Conditions | $(P/l)_{CrO_4-2}$ | $SF_{SO_4-2}^{CrO_4-2}$ |
|---|---|---|
| A. Single Fiber | $1 \times 10^{-3}$ | 3-4 |
| B. Test Bundle-Exterior Exposure | $2 \times 10^{-3}$ | 3-4 |
| C. Test Bundle-Interior Exposure | $1 \times 10^{-5}$ | N.M.* |

*N.M. = Not measured

EXAMPLE 5

Several different anisotropic hollow fiber membranes of copolymers of about 15 mol percent vinyl benzyl chloride, 70 mol percent styrene and 15 mol percent butyl methacrylate which had been solution spun from various liquid carriers were quaternized by (1) the two-step procedure of Example 3 using a pre-reaction quaternizing agent solution for 90 minutes, and (2) by a two-step procedure using a pretreatment solution for 3 hours of 3 weight percent sodium chloride and 0.02 weight percent of a cationic surfactant. In both procedures (1) and (2) the first steps were followed by a 24 hour immersion in the aqueous quaternizing solution comprising 10 weight percent trimethylamine, 3 weight percent sodium chloride and 0.02 weight percent of the cationic quaternary surfactant, hexadecyltrimethyl ammonium chloride. Table 5 shows that two-step procedure (2) employing the electrolyte compound and cationic surfactant yields permeabilities to chromate anions and separation factors for chromate anions with respect to sulfate anions equivalent to two-step procedure (1).

TABLE 5

| Fiber Membrane[a] | Procedure | $(P/l)_{CrO_4-2}$ (cm/sec) | $SF_{SO_4-2}^{CrO_4-2}$ |
|---|---|---|---|
| A | (1) | $1 \times 10^{-3}$ | 3-4 |
| A | (2) | $1 \times 10^{-3}$ | 3-4 |
| B | (2) | $1 \times 10^{-3}$ | 3-4 |
| C | (2) | $1 \times 10^{-3}$ | 3-4 |

[a] A = Copolymer of 43,600 wt. avg. mol. wt. spun from 25% solution in 2/1 by wt. dimethylformamide/isopropanol.
B = Copolymer of 43,600 wt. avg. mol. wt. spun from 30% solution in 1/1 by wt. N-methylpyrrolidone/1,4-dioxane.
C = Copolymer of 62,500 wt. avg. mol. wt. spun from 33% solution in 2/1 by wt. dimethylformamide/isopropanol.

EXAMPLE 6

Anisotropic hollow fiber membranes were solution spun from a 15 mol percent vinyl benzyl chloride, 70 mol percent styrene and 15 mol percent butyl methacrylate copolymer of 2,000,000 weight average molecular weight and 570,000 number average molecular weight. The hollow fibers were spun from a 30 weight percent solution of copolymer in a liquid carrier of 1 to 1 by weight N-methylpyrrolidone and 1,4-dioxane. The hollow fiber membranes had dimensions of 540 to 610 microns outside diameter and 260 and 320 microns inside diameter. Individual fiber membranes as described above with bores sealed were quaternized by two-step procedures using various aqueous pretreatment solutions overnight followed by reaction overnight with quaternizing solutions of the same compositions as the pretreatment solutions with the addition of 10 weight percent trimethylamine. When the quaternized hollow fiber membranes were dried, after washing to remove the quaternizing solutions, those quaternized with trimethylamine only gave lower permeabilities for chromate anions than those same fiber membranes which were pretreated and quaternized in the presence of an electrolyte. The quaternary cationic surfactant used, hexadecyltrimethylammonium chloride, also functions as an electrolyte in the quaternization reaction if present in significant amount as shown by run D. Table 6 shows the permeabilities to chromate anions and the separation factors for chromate anions with respect to sulfate anions for the variously pretreated and quaternized hollow fiber membranes.

TABLE 6

| Pretreatment Solution | Quaternizing Solution[a] | $(P/l)_{CrO_4-2}$ (cm/sec) | $S.F._{SO_4-2}^{CrO_4-2}$ |
|---|---|---|---|
| A. H$_2$O | TMA | $7 \times 10^{-4}$ | 2.5-3.0 |
| B. 3% NaCl + .02% HDTAC | NaCl + HDTAC + TMA | $1.5 \times 10^{-3}$ | 2.6-3.0 |
| C. 3% NaCl | NaCl + HDTAC + TMA | $3 \times 10^{-3}$ | N.M.[c] |
| D. .25% HDTAC | NaCl + HDTAC + TMA[b] | $2.4 \times 10^{-3}$ | 2.5 |

[a] HDTAC = hexadecyltrimethylammonium chloride
[b] TMA = 10 wt. percent trimethylamine, aqueous
[c] Not Measured

EXAMPLE 7

Anisotropic hollow fiber membranes of Example 6 were cut to desired length, assembled into bundles of 800 fibers and epoxy resin end seals cast and cured which closed each end of the bundle. The assembled membrane bundles were quaternized by immersing the bundles in a pretreatment solution comprising aqueous solutions of 3 wt. percent sodium chloride and 0.02 wt. percent cationic surfactant, hexadecyltrimethylammonium chloride, for 24 hours followed by immersion in a quaternizing solution of the same composition as the pretreatment solutions plus 10 wt. percent trimethylamine for 24 hours. The membrane bundle assemblies were washed, the fiber bore ends opened and, without allowing the membranes to dry, were then inserted into steel shells 1 inch in diameter and 12 inches in length and the end seals cemented into place at each end of the shells to complete test modules. The modules were capped and sealed to maintain the membranes moist until tested.

The test modules were utilized in dialysis of aqueous dialysis feed solutions comprising about 200 ppm $Cr^6$ (446 ppm chromate anion), 2000 ppm sulfate anion and 200 ppm calcium cation against an aqueous dialysate solution of 3 wt. percent sodium chloride. Net permeabilities, of the assembled modules to chromate anions, $(P_A)_{CrO_4-2}$ and, the separation factors for chromate anions with respect to sufate anions are shown in Table 7 for three typical modules. The relative flow rates of the dialysis feed solution, pumped around the exterior of the hollow fiber membranes, with respect to the flow rates of the sump or dialysate solution, pumped through the bores of the hollow fiber membranes, ranged from about 4:1 to about 7:1.

TABLE 7

| Module | Flow rate, Shell/Bore | $(P_A)_{CrO_4-2}$ (cm/sec) | $SF^{CrO_4-2}_{SO_4-2}$ |
|---|---|---|---|
| A | 6.1 | $1.5 \times 10^{-4}$ | 3.3 |
| B | 7.1 | $2.0 \times 10^{-4}$ | 3.4 |
| C | 4.5 | $2.4 \times 10^{-4}$ | N.M.[b] |

[a] $(P_A)_{CrO_4-2} = \frac{\text{Feed Flow Rate}}{\text{log mean Surface Area}} \cdot \frac{Cr^6 \text{ Conc. Feed} - Cr^6 \text{ Conc. Exit}}{Cr^6 \text{ Conc. Exit}}$

[b] N.M. = not measured.

A second group of the anisotropic hollow fiber membranes of Example 6 were assembled into membrane bundles and sealed at the ends in the same manner as above. The membrane bundles were quaternized by a one-step procedure in which the membrane bundles were soaked in a quaternizing aqueous solution comprising 3 wt. percent sodium chloride, 10 wt. percent trimethylamine and 0.02 wt. percent of the same cationic surfactant as above for 24 hours. The membrane bundles were then washed, the fiber bores opened and the bundles assembled into module shells in the same manner as above. When the dialysis tests described above were repeated the modules containing membranes quaternized by the above one-step procedure performed similarly to those quaternized by the procedure utilizing the pretreatment solution prior to the quaternizing reaction, indicating the one-step procedure to produce satisfactory results in a single 24 hour period.

We claim:

1. In a process for quaternizing reactive haloalkyl groups in a hollow fiber polymer membrane by reacting with an amine quaternizing agent, the improvement comprising reacting said haloalkyl groups with a solution containing from about 3 to about 50 weight percent of a tertiary amine quaternizing agent in the presence of from about 0.05 to about 10 weight percent of an electrolyte compound soluble in the solution, the reaction occurring at a temperature from about 0° C. to about 75° C.

2. The process of claim 1 wherein the electrolyte compound is diffused into said polymer membrane prior to said reaction.

3. The process of claim 1 wherein said hollow fiber polymer membrane is initially swollen by contact with a solution of tertiary amine quaternizing agent prior to said reaction in the presence of an electrolyte compound.

4. The process of claim 1 wherein said solution contains from about 0.001 to about 0.05 weight percent of a cationic quaternary ammonium halide surfactant.

5. The process of claim 2 wherein said electrolyte is diffused into said membrane in the presence of a cationic quaternary ammonium surfactant.

6. The process of claims 1 or 3 wherein said solution of quaternizing agent is an aqueous solution.

7. The process of claim 1 wherein said solution comprises from about 5 to about 25 weight percent of a tertiary amine quaternizing agent.

8. The process of claim 1 wherein said electrolyte compound is a halide salt.

9. The process of claim 8 wherein said electrolyte compound is sodium chloride.

10. The process of claim 1 wherein the quaternizing agent is a tri-lower alkyl monoamine.

11. The process of claim 10 wherein the quaternizing agent is trimethylamine.

12. The process of claim 4 wherein the cationic quaternary ammonium halide surfactant is hexadecyl trimethylammonium chloride.

13. The process of claim 1 wherein said hollow fiber polymer membrane is an anisotropic hollow fiber polymer membrane.

14. The process of claim 13 wherein said anisotropic hollow fiber membrane has a thin dense layer at both the interior and exterior surfaces.

15. The process of claim 14 wherein one surface of said membrane is contacted with said solution of quaternizing agent.

16. The process of claim 15 wherein the surface of the membrane to be exposed to a dialysis feed solution is contacted with said solution of quaternizing agent.

17. The process of claim 16 wherein the exterior surface of said membrane is contacted with said solution of quaternizing agent.

18. The process of claim 16 wherein the interior surface of said membrane is contacted with said solution of quaternizing agent.

19. The process of claim 1 wherein the reaction occurs at a temperature from about 0° to about 50° C.

* * * * *